US008113749B2

(12) United States Patent
Dost et al.

(10) Patent No.: US 8,113,749 B2
(45) Date of Patent: Feb. 14, 2012

(54) AUGER BIT INCLUDING A REAMER

(75) Inventors: Hagen Walter Dost, Chicago, IL (US); Javier Ibarra, Schaumburg, IL (US)

(73) Assignee: Robert Bosch GmbH, Stuttgart (DE)

( * ) Notice: Subject to any disclaimer, the term of this patent is extended or adjusted under 35 U.S.C. 154(b) by 1134 days.

(21) Appl. No.: 11/982,942

(22) Filed: Nov. 6, 2007

(65) Prior Publication Data

US 2009/0116919 A1 May 7, 2009

(51) Int. Cl.
*B23B 51/02* (2006.01)
*B27G 15/00* (2006.01)

(52) U.S. Cl. ........................................ 408/214; 408/224

(58) Field of Classification Search .......... 408/211–214, 408/223–225, 230; *B27G 15/00*
See application file for complete search history.

(56) References Cited

U.S. PATENT DOCUMENTS

| | | | | | |
|---|---|---|---|---|---|
| 36,534 | A | * | 9/1862 | Sanford | 408/214 |
| 52,056 | A | * | 1/1866 | Lamson | 408/212 |
| 79,012 | A | * | 6/1868 | Sanford | 408/214 |
| 95,803 | A | * | 10/1869 | Ives | 408/214 |
| RE4,156 | E | * | 10/1870 | Ives | 408/214 |
| 166,221 | A | * | 8/1875 | Parsons | 408/212 |
| 235,234 | A | * | 12/1880 | Hardisty | 408/212 |
| 413,972 | A | * | 10/1889 | Shaler | 408/212 |
| 606,319 | A | * | 6/1898 | Watrous | 408/224 |
| 716,557 | A | | 12/1902 | Klingensmith | |
| 782,368 | A | | 2/1905 | Swan | |
| 1,004,902 | A | | 10/1911 | Potter | |
| 1,260,068 | A | | 3/1918 | Sanders | |
| 1,465,870 | A | * | 8/1923 | Sanders | 408/213 |
| 1,483,082 | A | * | 2/1924 | Dosimont | 408/214 |
| 1,557,900 | A | | 10/1925 | Thompson | |
| 2,883,888 | A | | 4/1959 | Stewart | |
| 3,697,188 | A | | 10/1972 | Pope | |
| RE28,900 | E | | 7/1976 | Byers et al. | |
| 4,536,107 | A | | 8/1985 | Sandy et al. | |
| 5,244,319 | A | | 9/1993 | Cochran | |

FOREIGN PATENT DOCUMENTS

| | | | | |
|---|---|---|---|---|
| CA | 2097971 | A | * | 12/1994 |
| GB | 13484 | | | 1/1912 |
| JP | 11156811 | A | * | 6/1999 |
| JP | 2006192820 | A | * | 7/2006 |

OTHER PUBLICATIONS

JPO website translation of JP 2006-192820, printed Jun. 2011.*
JPO website translation of JP 11-156811, printed Jun. 2011.*

* cited by examiner

*Primary Examiner* — Daniel Howell
(74) *Attorney, Agent, or Firm* — Greer, Burns & Crain, Ltd.

(57) ABSTRACT

Embodiments of the invention comprise an auger bit for use with a power drill including an elongated member including a first end and an opposing second end, a helical surface having a central axis, where the helical surface defines at least one flute, a head portion integrally formed with the first end of the elongated member and including a primary cutting edge adapted to engage and remove material from a workpiece and a secondary cutting edge adapted to engage and remove additional material from the workpiece, a threaded tip integrally formed with the head portion and a shank integrally formed with the second end of the elongated member and adapted to engage the drill.

15 Claims, 8 Drawing Sheets

AUGER BIT INCLUDING A REAMER

BACKGROUND OF THE INVENTION

The present invention generally relates to hand tools, and more particularly to an auger bit for a drill.

Drill bits come in all different shapes and sizes and are used for a variety of purposes. Typically, drill bits are used to form a recess or through hole in a material such as metal or wood. One type of drill bit is an auger bit, which is primarily used to form recesses and holes in wood. In operation, the auger bit is attached to a drill and rotated to enable a cutting edge on the auger bit to remove material from the wood to form the recess or hole. A long deep spiral flute on the auger bit moves the removed material out of the recess or hole so that the material doesn't obstruct the drilling operation.

Auger bits are commonly used in the construction industry. In particular, electricians, plumbers and other contractors need to drill holes through wood framing studs to run conduit, pipes, wires and other components through the studs. Typically, an auger bit is attached to a motorized power drill. The power drill rotates the auger bit to drill one or more holes in a wood stud or other workpiece.

During drilling, it is common to encounter nails and other fasteners that are in the wood for securing wood framing studs together or for other purposes. The contact between the auger bit and the fasteners can dull, damage or break the cutting edges and surfaces of the auger bit. As the auger bit gets duller, the bit fails to effectively cut the wood, which causes heat buildup and possible binding of the bit in the wood. Additionally, the complex shape of an auger bit makes it difficult to re-sharpen, which decreases the useful life of the bit.

Typically, after an auger bit cuts and forms a hole in a piece of wood, the inside surface of the hole is rough and includes bits, fragments and particles of wood that extend at least partially into the hole. The rough inside surface of the hole can cause conduit, pipes, wires and the like to get snagged or hung up on the inside surface.

A common method in metal drilling to assure an accurate size hole with a good surface finish is to use a reamer or reaming bit. A reaming bit is a multipoint cutting tool with straight cutting edges that comes in many different shapes and sizes.

It would therefore be beneficial to provide a drill bit including a reaming portion for drilling accurate, smooth holes in wood.

SUMMARY OF THE INVENTION

Embodiments of the invention comprise an auger bit for use with a power drill including an elongated member including a first end and an opposing second end, a helical surface having a central axis, where the helical surface defines at least one flute, a head portion integrally formed with the first end of the elongated member and including a primary cutting edge adapted to engage and remove material from a workpiece and a secondary cutting edge adapted to engage and remove additional material from the workpiece, a threaded tip integrally formed with the head portion and a shank integrally formed with the second end of the elongated member and adapted to engage the drill.

DESCRIPTION OF THE PREFERRED EMBODIMENTS

Figure 1:
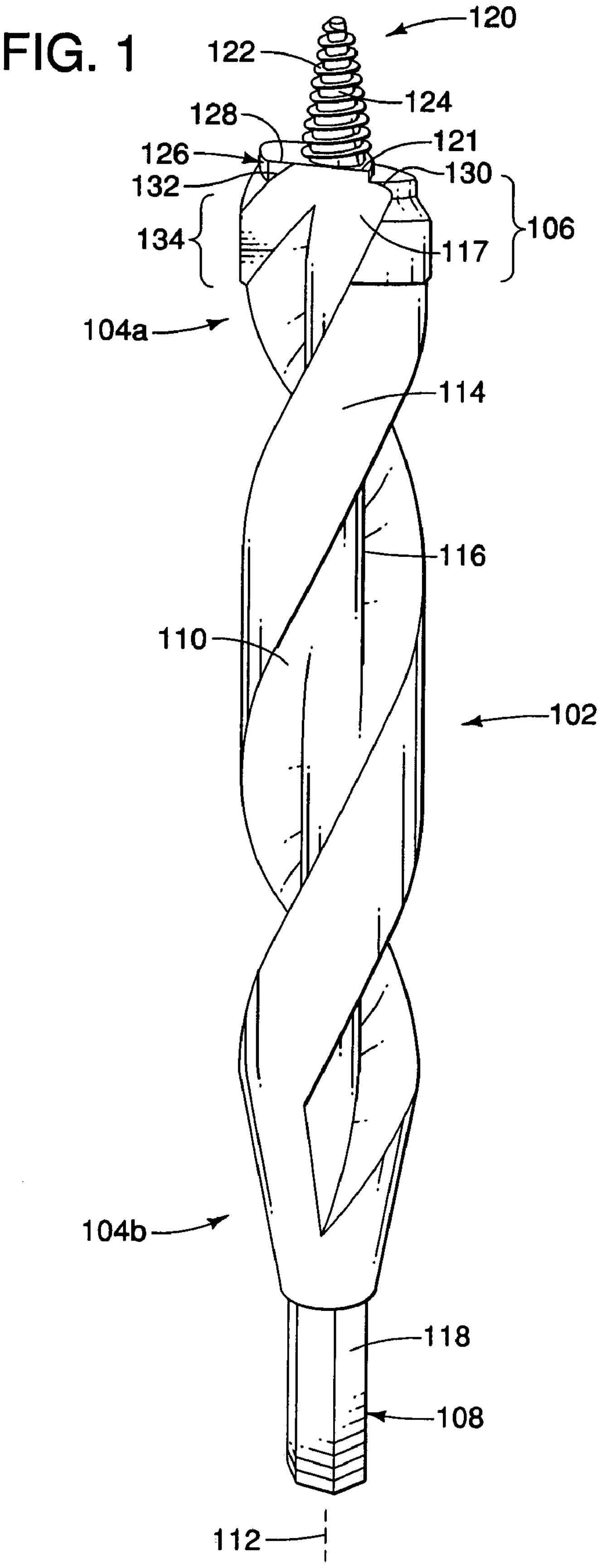
FIG. 1 is a side perspective view of an auger bit including a reaming portion embodying the present invention.
Figure 2:
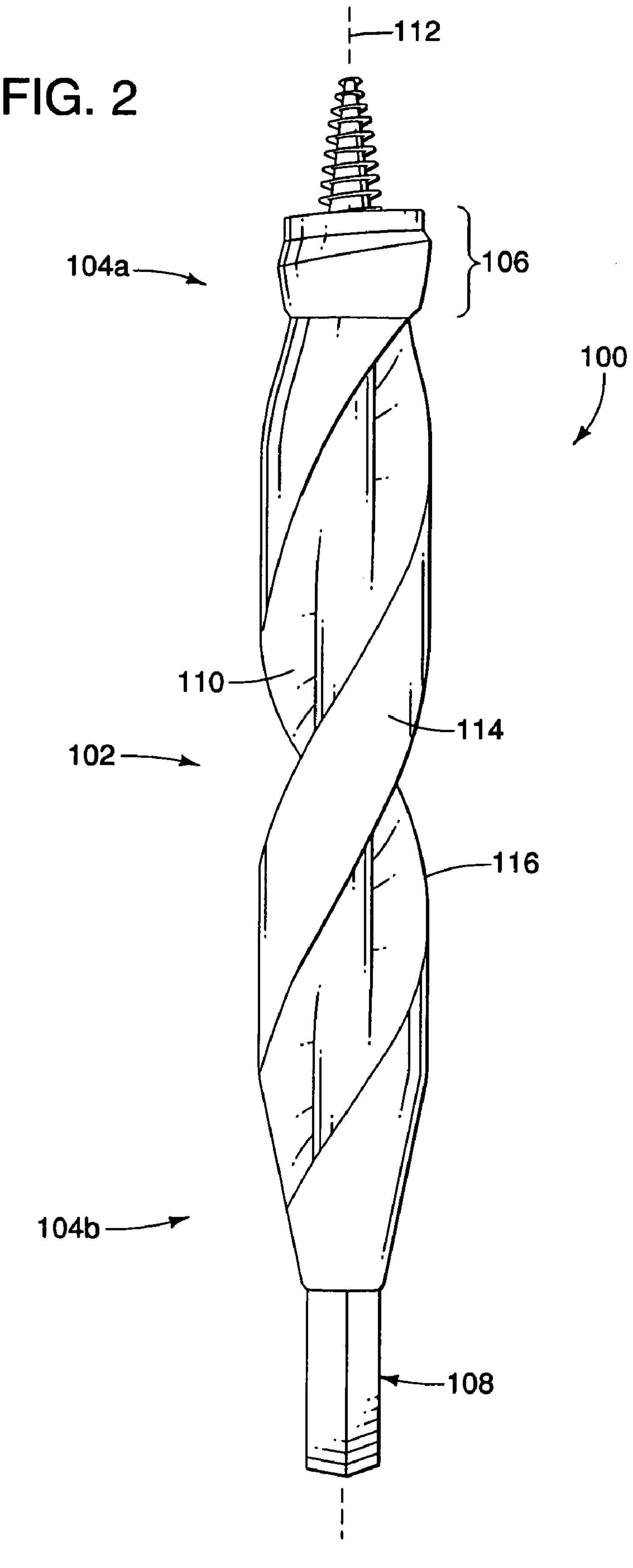
FIG. 2 is a side perspective view of the auger bit shown in FIG. 1 showing another side of the auger bit.
Figure 3:
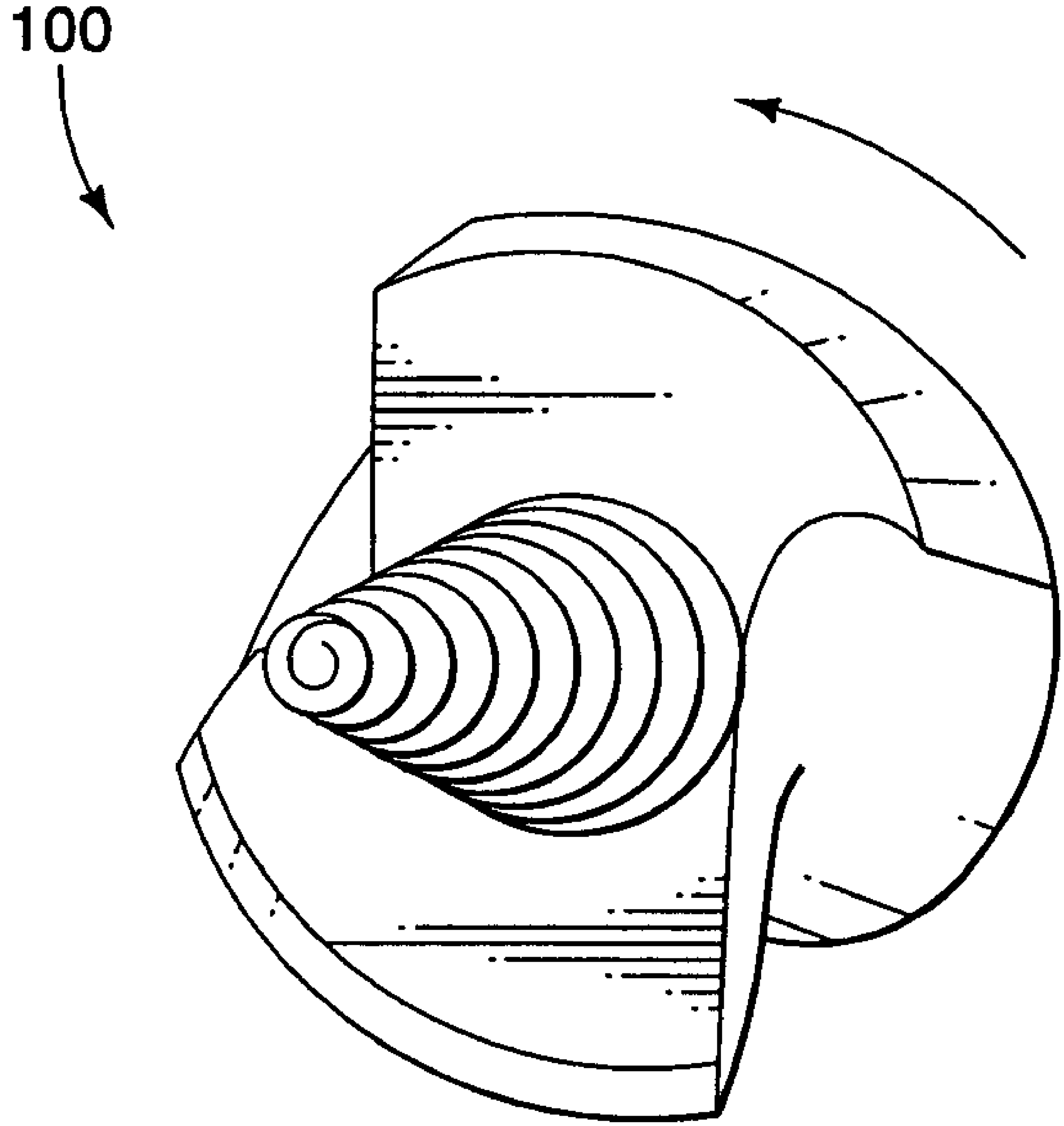
FIG. 3 is a top view of the auger bit shown in FIG. 1.

Embodiments of the present invention are particularly appropriate for use with power drills. However, it should be appreciated that the present invention may be used with non-powered drills for cutting holes in wood and other materials.

Auger bits are typically used to drill holes or bores in wood. For example, auger bits are commonly used in construction to drill holes through wood framing studs for installing electrical conduit, plumbing pipes and other similar items. Typically, the holes formed by an auger bit have a rough inside surface. Therefore, when a piece of conduit or pipe is inserted through the hole, it can get hung up on the rough surface, which makes installation very difficult and time-consuming. Fasteners in the wood also cause problems by weakening, dulling or breaking the cutting edges of the auger bits when the auger bits contact the fasteners during drilling. The auger bit of the present invention performs both drilling and reaming operations to overcome these problems.

Referring now to FIGS. 1-6, an auger bit generally designated as 100 includes an elongated member or auger portion 102 having a first end 104*a* and an opposing second end 104*b*, a head portion 106 integrally formed with the first end 104*a* of the auger portion 102 and an attachment member or shank 108 integrally formed with the second end 104*b* of the auger portion 102.

The auger portion 102 includes an elongated shaft 110 having a central axis 112. The shaft 110 includes a helical outer surface 114 that spirals around the central axis 112 extending from the first end 104*a* to the second end 104*b* of the auger portion 102. It should be appreciated that the helical outer surface may spiral about the central axis 112 for one or a plurality of turns. The helical outer surface 114 defines two flutes 116 on opposite sides that also spiral about the central axis 112 and extend from the first end 104*a* to the second end 104*b* of the auger portion 102. The shank 108 is inserted into a chuck of a drill such as a power drill and secured in place. The drill rotates the shank 108, which in turn, rotates the auger bit 100. As the auger bit 100 rotates, cut wood material is moved out of the hole by the auger portion 102 to ensure that the cut material does not bind the auger bit before the drilling operation is complete.

Varying the depth of the flutes 116 affects the ability of the auger portion 102 to remove material from a drilled hole. For example, a deeper flute improves the rate at which cut material is removed from a drilled hole. However, providing a deeper flute, reduces the material that is used to form the auger portion 102, which decreases the structural integrity or strength of the auger bit 100. The spacing of the turns of the helical outer surface 114 also affects the function of the auger bit 100. In the illustrated embodiment, the flutes 116 each have a high pitch to allow for fast removal of the cut material. It should be appreciated that the flutes may have any suitable pitch. In the illustrated embodiment, the flute profile is round. It should be appreciated that the flute may be round, square or be any suitable shape.

The shank 108 is integrally formed with the second end 104*b* of the auger portion 102 and has a generally hexagonal shape that is inserted and secured in a chuck or similar attachment mechanism of a power drill. The shape of the shank 108 may be any suitable shape such as a hexagonal shape, octagonal shape and the like. The walls or outer surfaces 118 of the shank form gripping surfaces that are contacted and secured in the chuck of a drill.

The head portion 106 is integrally formed with the first end 104*a* of the auger portion 102 and includes cutting edges and cutting surfaces that cut through a piece of wood or other material. To facilitate the drilling operation, a feed portion such as threaded, self-feeding tip 120 is integrally formed with the first end 104*a* of the auger portion 102. The threaded tip 120 has a generally conical shape and includes a helical thread 122 that spirals about the central axis 112 of the auger portion from the top to the bottom of the tip. The thread defines a flute 124, which spirals about the central axis 112. When the auger bit 100 is rotated by a power drill, the tip 120 engages and draws the auger bit into a workpiece to facilitate the drilling of a hole in the workpiece. In another embodiment, the head portion 106 includes a removable and replaceable tip 120. It should be appreciated that the auger bit 100 does not have to include the threaded tip 120.

Figure 4:
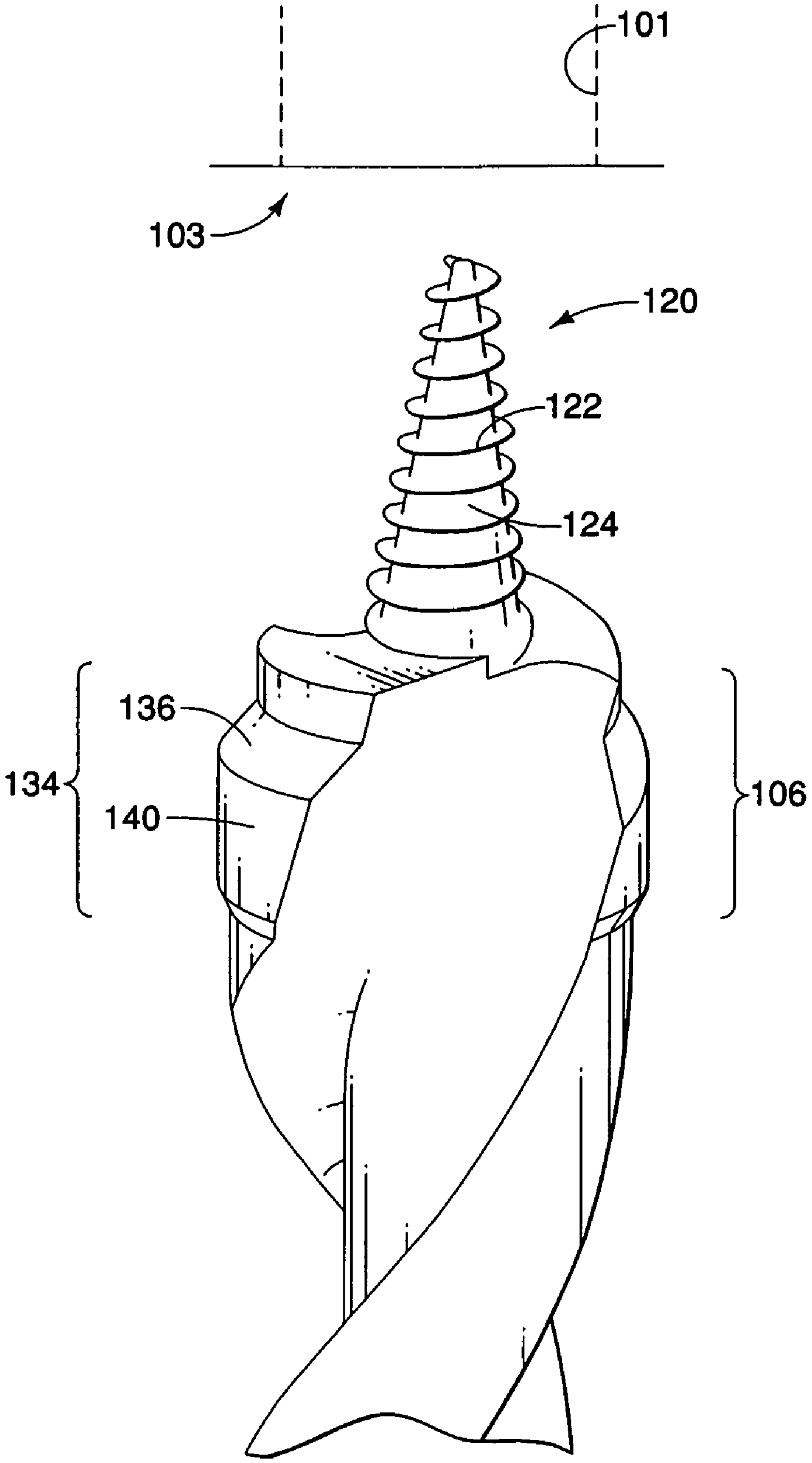
FIG. 4 is an enlarged, fragmented perspective view of the auger bit shown in FIG. 1 and a hole formed by the auger bit.
Figure 5:
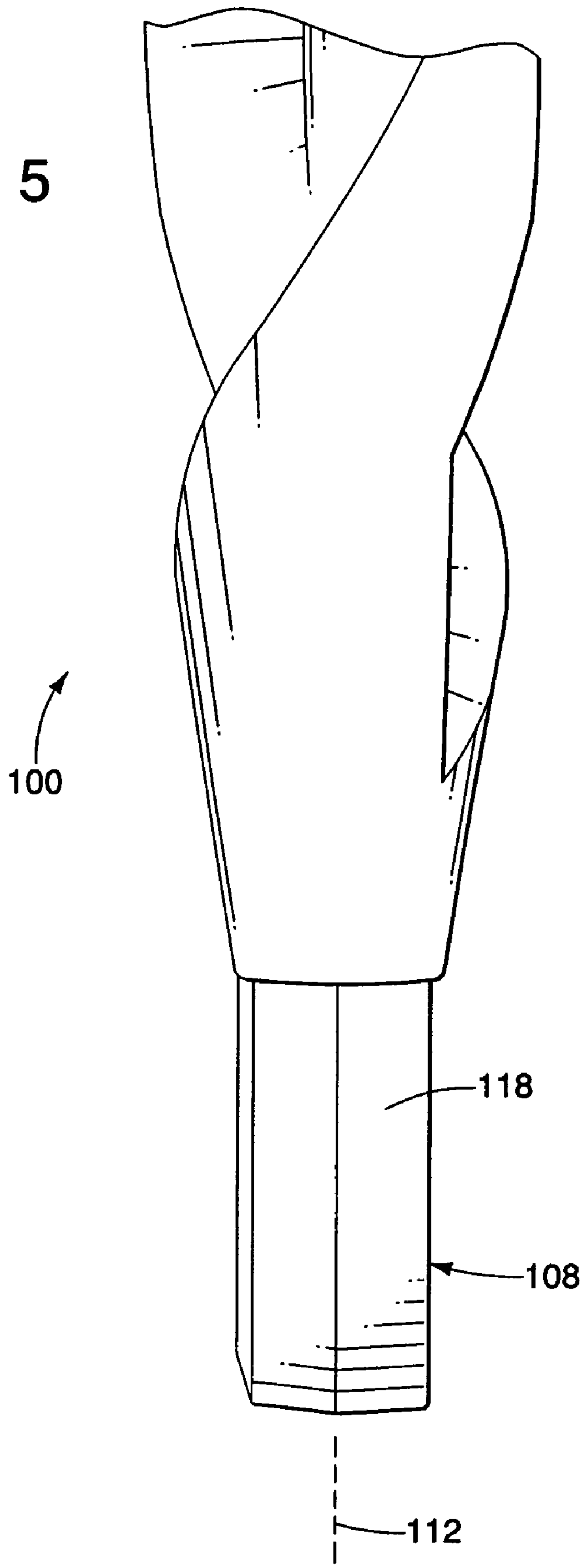
FIG. 5 is an enlarged, fragmented perspective view of the auger bit shown in FIG. 1 showing the shank.

The head portion 106 includes a primary cutting edge 126 that is tangential to an outer surface 121 of the threaded tip 120. The primary cutting edge 126 has a generally straight cutting portion 128 and is located along one of the flutes 116. A generally curved non-cutting portion 130 is formed by the intersection of the primary cutting edge 126, the flute 116 and a clearance grind area 117. It should be appreciated that the primary cutting edge 126 may be located along one of the flutes 116 as shown in FIGS. 1 and 4 or located in a different position on the head portion 106. A primary cutting surface 132 defined by one of the flutes 116 and extending generally parallel to the central axis 112 from the primary cutting edge 126. The combination of the primary cutting edge 126 and the primary cutting surface 132 cuts an initial hole in the wood having a diameter substantially equal to the length of the primary cutting edge 126 or twice the radial distance from the primary cutting edge to the central axis 112. The primary cutting edge 126 engages a piece of wood and removes portions of the piece of wood as the power drill rotates the auger bit 100. It should be appreciated that the auger bit 100 includes a second, identical primary cutting edge 126 formed at the top of the opposing flute 116. The description and operation of the second primary cutting edge is identical to the primary cutting edge 126. In another embodiment, at least one or both of the primary cutting edges 126 are non-tangential to the outer surface of the threaded tip 120. It should be appreciated that one or both primary cutting edges 126 may form an angle with respect to the central axis 112 (i.e., being slanted upward or downward relative to the central axis).

After the initial hole is cut by the primary cutting lip or primary cutting edge 126, a reaming portion 134 enlarges and smoothes the inside surface 101 of the drilled hole 103. The reaming portion 134 is formed on the head portion 106 and includes a transition portion 136 that extends from the primary cutting edge 126. The transition portion 136 forms an angle 138 with respect to the central axis 112. In the illustrated embodiment, the angle 138 of the transition portion 136 is generally between 30° and 70°. It should be appreciated that the angle 138 may be any suitable angle.

Figure 6:
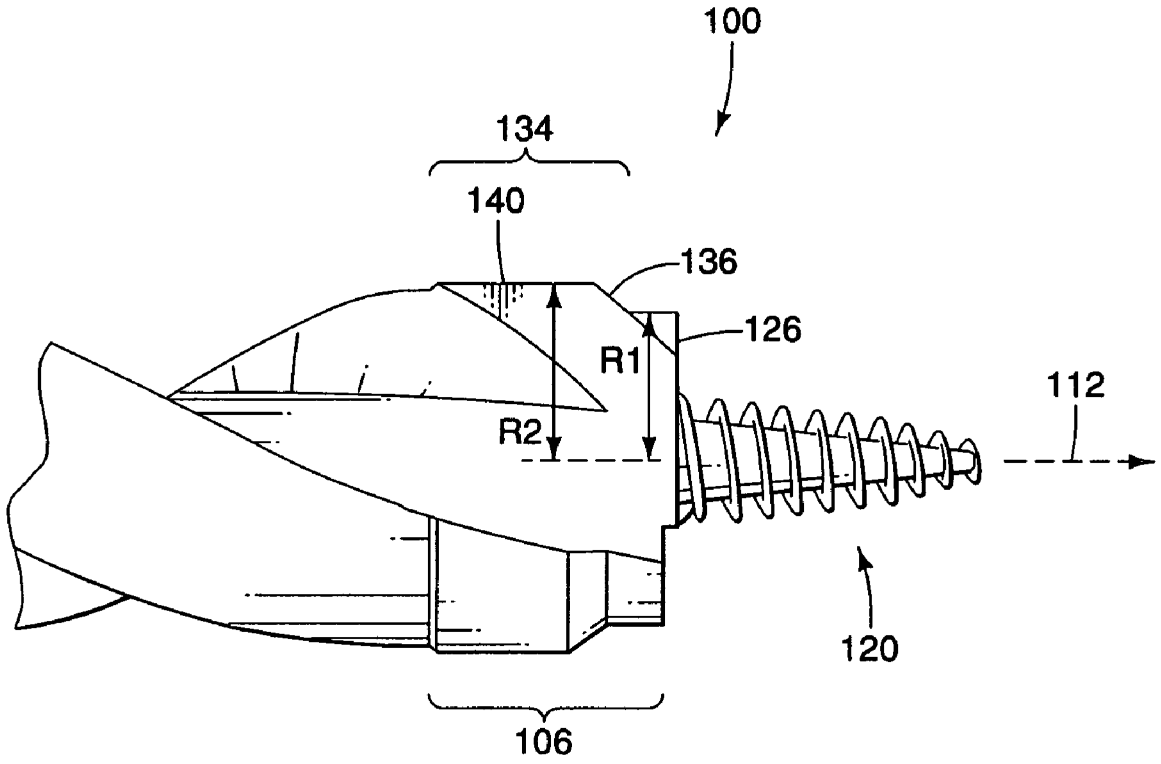
FIG. 6 is an enlarged, fragmented perspective view of the auger bit shown in FIG. 1 showing a side of the top of the auger bit.
Figure 7:
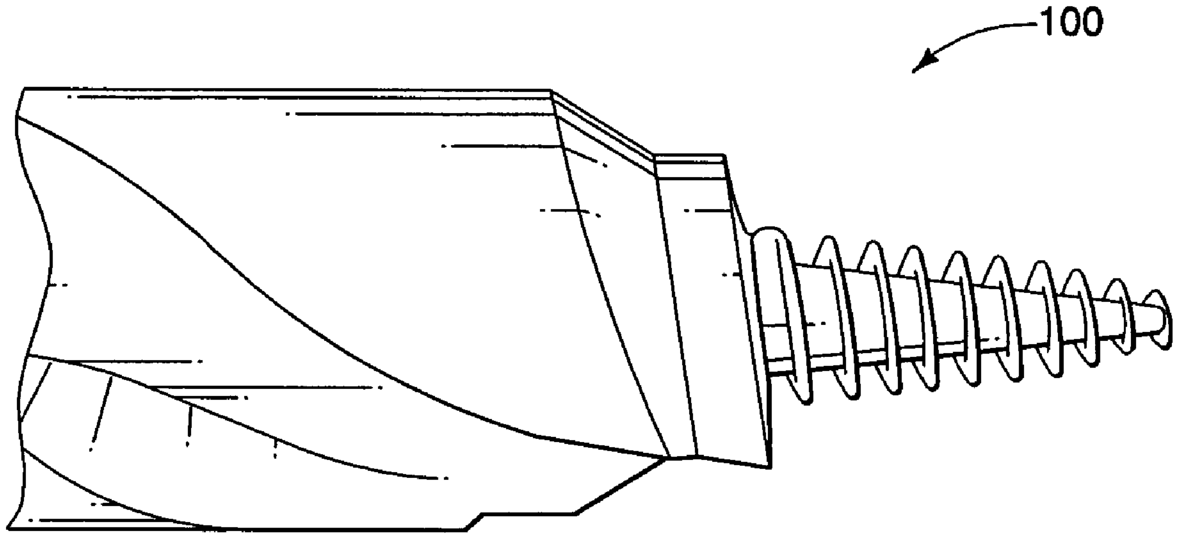
FIG. 7 is an enlarged, fragmented perspective view of the auger bit shown in FIG. 1 showing another side of the top of the auger bit.
Figure 8:
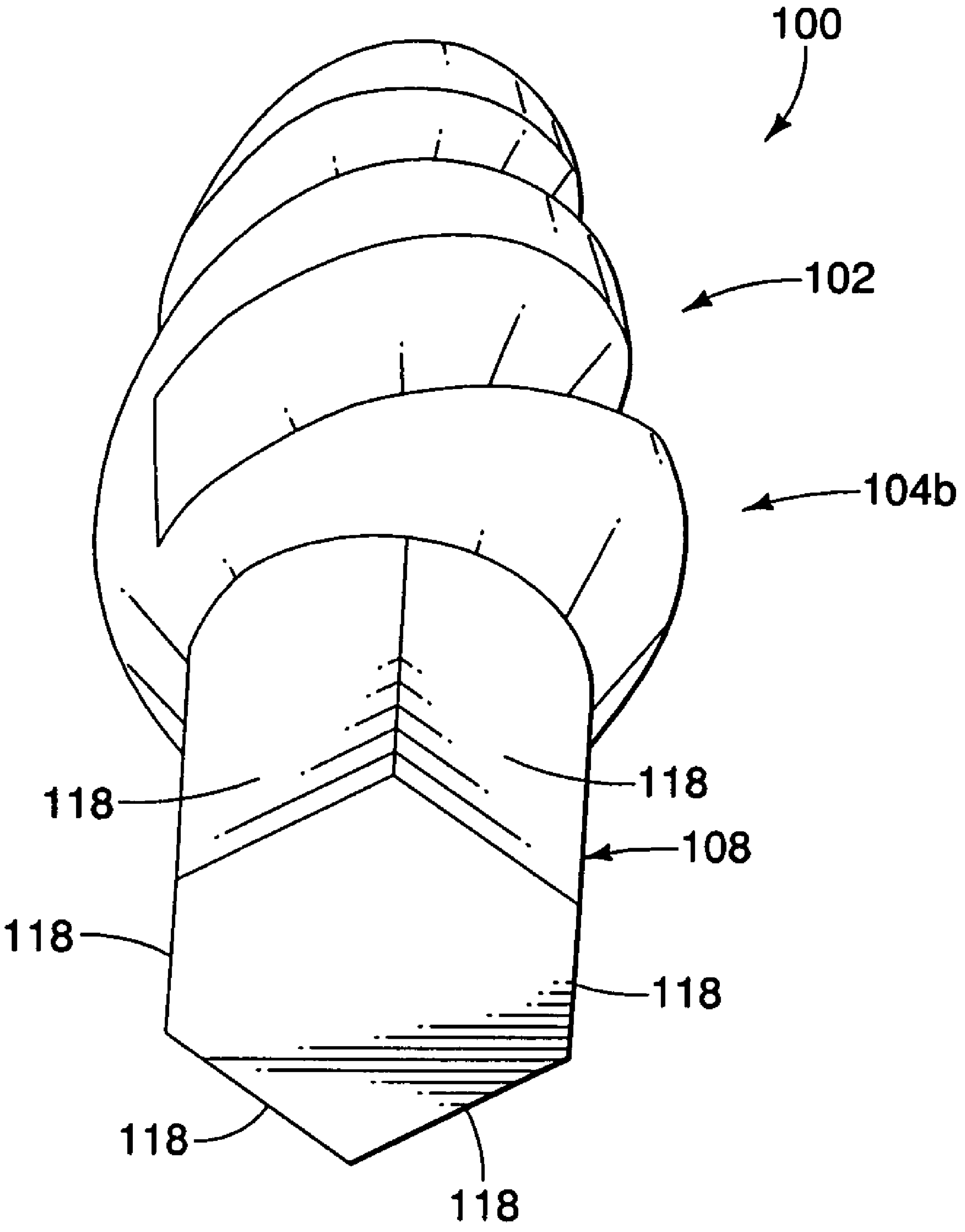
FIG. 8 is an enlarged perspective view of the auger bit shown in FIG. 1 showing the shank.

The reaming portion 134 includes a secondary cutting lip, secondary scraping edge or secondary cutting edge 140 that is generally parallel to the central axis 112, extends from the transition portion 136 and shears or scrapes material chips that remain attached to the inside surface 101 of a drilled hole formed by the primary cutting edge 126. In particular, the secondary cutting edge 140 helps to remove burrs, chips, particles and other fragments that remain on the rough inside surface of the drilled hole. As shown in FIG. 6, the primary cutting edge 126 is located at a first radial distance, R1, from the central axis and the secondary cutting edge 140 is located at a second radial distance, R2, from the central axis 112. In the illustrated embodiment, the second radial distance R2 is greater than the first radial distance R1, which allows the reaming portion 134, or secondary cutting edge 140, to enlarge the drilled hole and remove the burrs, chips and fragments that remain on the inside surface 101 of the hole 103. The transition portion 136 provides a gradual transition from the primary cutting edge 126 to the secondary cutting edge 140, which enhances the cleanness and smoothness of the drilled hole 103 after the drilling is finished. Therefore, the present auger bit 100 provides a significant advantage over a conventional auger bit, which has to be replaced with a separate reaming bit to enlarge and smooth a drilled hole.

In the above embodiment, the reaming portion 134 begins adjacent to the primary cutting edge 126. It is also contemplated that the reaming portion 134 can begin at a point below or spaced away from the primary cutting edge 126. Furthermore, the reaming portion 134 is shown as following the primary cutting edge 126. Also, the illustrated embodiment shows the auger bit 100 including one transition portion 136 and one reaming portion 134. It is also contemplated that the auger bit 100 can include a plurality of transition portions and/or reaming portions to gradually increase the diameter of a drilled hole. Further, it should be appreciated that the reaming portion 134 may be formed using an integral material or a secondary material such as carbide, HSS, etc.

The length of the auger bit 100 from the top of the threaded tip 120 to the bottom of the shank 108 varies and may be any suitable length. Generally, the auger bit 100 has a length of between 4 inches to twenty-four inches to maintain the structural integrity of the bit and reduce the chance that the auger bit 100 will break during a drilling operation. It should be appreciated that the auger bit may be any suitable length.

The auger bit 100 is manufactured by taking a suitable piece of metal material such as a cylindrical piece of medium carbon steel and forming the different portions of the bit. Specifically, the primary cutting edge 126, the transition portion 136 and the secondary cutting edge 140 are machined in a single step, which saves significant time over conventional manufacturing methods that employ multiple machining steps to form the different cutting surfaces of an auger bit. Additionally, the primary and secondary cutting edges 126, 136 and 140 are thicker than the cutting edges of conventional auger bits to enhance the strength and nail hitting capability of the auger bit. The auger bit 100 also has a simpler geometry that makes re-sharpening easier and more efficient than conventional auger bits, which enhances the useful life of the auger bit 100.

In operation, the shank 108 of the auger bit 100 is secured in a chuck of a power drill. The power drill rotates the auger bit 100 in a counterclockwise direction as shown by the arrow in FIG. 3. The auger bit 100 is moved toward a piece of wood such as a framing stud so that the threaded tip 120 contacts the wood. The spiral thread 122 on the threaded tip 120 engages the wood and pulls the auger bit 100 into the wood. The primary cutting edge 126 then engages the wood surface and cuts away the wood to a diameter equal to the diameter of the primary cutting edge (i.e., twice the radial distance R1 from the end of the primary cutting edge to the central axis). The transition portion 136 contacts the wood and gradually increases the diameter of the hole to the secondary cutting edge 140. The secondary cutting edge 140 removes additional material from the hole and in particular removes the burrs, fragments and other rough pieces of the inside surface of the hole that were left by the primary cutting edge 126. The resulting drilled hole 103 has a relatively smooth inside surface 101 that has the diameter of the secondary cutting edge 140 (i.e., twice the radial distance R2 from the secondary cutting edge to the central axis).

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. An auger bit for use in a drill, said bit comprising:

an elongated member including a first end, an opposing second end and a helical surface having a central axis, said helical surface defining at least one flute;

a head portion integrally formed with said first end of said elongated member and including a primary cutting edge adapted to engage and remove material from a workpiece and a secondary cutting edge adapted to engage and remove additional material from the workpiece, said primary and secondary cutting edges being parallel to and aligned with the central axis and axially spaced apart;

a threaded tip integrally formed with said head portion; and a shank integrally formed with said second end of said elongated member and adapted to engage the drill.

2. The auger bit of claim 1, wherein said primary cutting edge is tangential to an outer surface of said tip.

3. The auger bit of claim 1, wherein said primary cutting edge extends laterally outwardly from said central axis a first radial distance and said secondary cutting edge extends laterally outwardly from said central axis a second radial distance, wherein said second radial distance is greater than said first distance.

4. The auger bit of claim 1, wherein said head portion further comprises a transition portion between said primary cutting edge and said secondary cutting edge.

5. The auger bit of claim 4, wherein said transition portion forms an angle with said central axis.

6. The auger bit of claim 4, wherein said transition portion forms an angle with said central axis, said angle being between 30 degrees and 70 degrees.

7. The auger bit of claim 1, wherein said head portion further comprises a plurality of transition portions between said primary cutting edge and said secondary cutting edge.

8. The auger bit of claim 1, wherein said secondary cutting edge is positioned a designated distance away from said primary cutting edge.

9. An auger bit for use in a drill to form a hole in a workpiece, the auger bit including an elongated member including a first end and an opposing second end, a helical surface having a central axis, the helical surface defining at least one flute, a shank integrally formed with the second end of the elongated member and adapted to engage the drill and a head portion integrally formed with the first end of the elongated member, the head portion comprising:

a threaded tip that initially engages the workpiece;

a primary cutting edge adapted to remove material from the workpiece; and a secondary cutting edge axially spaced from said primary cutting edge and adapted to remove additional material from the workpiece, said primary and secondary cutting edges being parallel to and aligned with the central axis.

10. The auger bit of claim 9, wherein said primary cutting edge is tangential to an outer surface of said tip.

11. The auger bit of claim 9, wherein said secondary cutting edge is positioned a designated distance from said primary cutting edge.

12. The auger bit of claim 9, further comprising at least one transition portion positioned between said primary cutting edge and said secondary cutting edge.

13. The auger bit of claim 12, wherein said at least one transition portion forms an angle with the central axis.

14. The auger bit of claim 12, wherein said at least transition portion forms an angle with said central axis, said angle being between 30 degrees and 70 degrees.

15. An auger bit for use in drilling a hole in a work piece, said bit comprising:

an elongated shank for securing the bit in a drilling tool;

an enlarged generally cylindrical head portion at one end of said shank;

said head portion having a central axis and further comprising:

a conical-shaped spiral feed portion concentric with said axis at the outer end for pulling said bit into the work piece during drilling;

at least one flute extending along the side of said head portion;

a first portion intersecting said at least one flute and having a primary cutting edge extending radially from said feed portion to a first radius from said central axis and an outer edge extending toward said shank parallel to said central axis;

a second portion intersecting said at least one flute and including a secondary cutting edge extending radially from said central axis to a second radius and having an outer edge extending toward said shank portion parallel to said central axis, said second radius being larger than said first radius, wherein said primary cutting edge is axially spaced from said secondary cutting edge; and an angled third portion intersecting said at least one flute connecting said first portion and said second portion.

* * * * *